Sept. 6, 1955 T. J. PINION ET AL Re. 24,059

GATE HINGE

Original Filed Dec. 26, 1952 2 Sheets-Sheet 1

INVENTORS
Thomas J. Pinion
and Jack D. Kellough
BY Chas. Denegre
Attorney.

GATE HINGE

Original Filed Dec. 26, 1952 2 Sheets-Sheet 2

INVENTORS
Thomas J. Pinion
BY and Jack D. Kellough
Chas. Denegre
Attorney.

United States Patent Office

Re. 24,059
Reissued Sept. 6, 1955

24,059

GATE HINGE

Thomas J. Pinion, Birmingham, and Jack D. Killough, Adamsville, Ala.; said Pinion assignor to said Killough Original No. 2,702,399, dated February 22, 1955, Serial No. 327,946, December 26, 1952. Application for reissue April 11, 1955, Serial No. 500,716

3 Claims. (Cl. 16—153)

Matter enclosed in heavy brackets [ ] appears in the original patent but forms no part of this reissue specification; matter printed in italics indicates the additions made by reissue.

This invention relates to a gate hinge. It has for its main objects to provide a hinge that will be highly satisfactory for the purpose intended, simple in structure, cheap to manufacture, easy to install, and extremely durable. Its dominating feature is that it provides means for mounting a gate in such a way that it will be adapted for being pushed open by an automobile and will automatically close after the car has passed through and cleared the gate.

Other objects and advantages will appear from the drawings and description.

Figures 1, 2, 3:
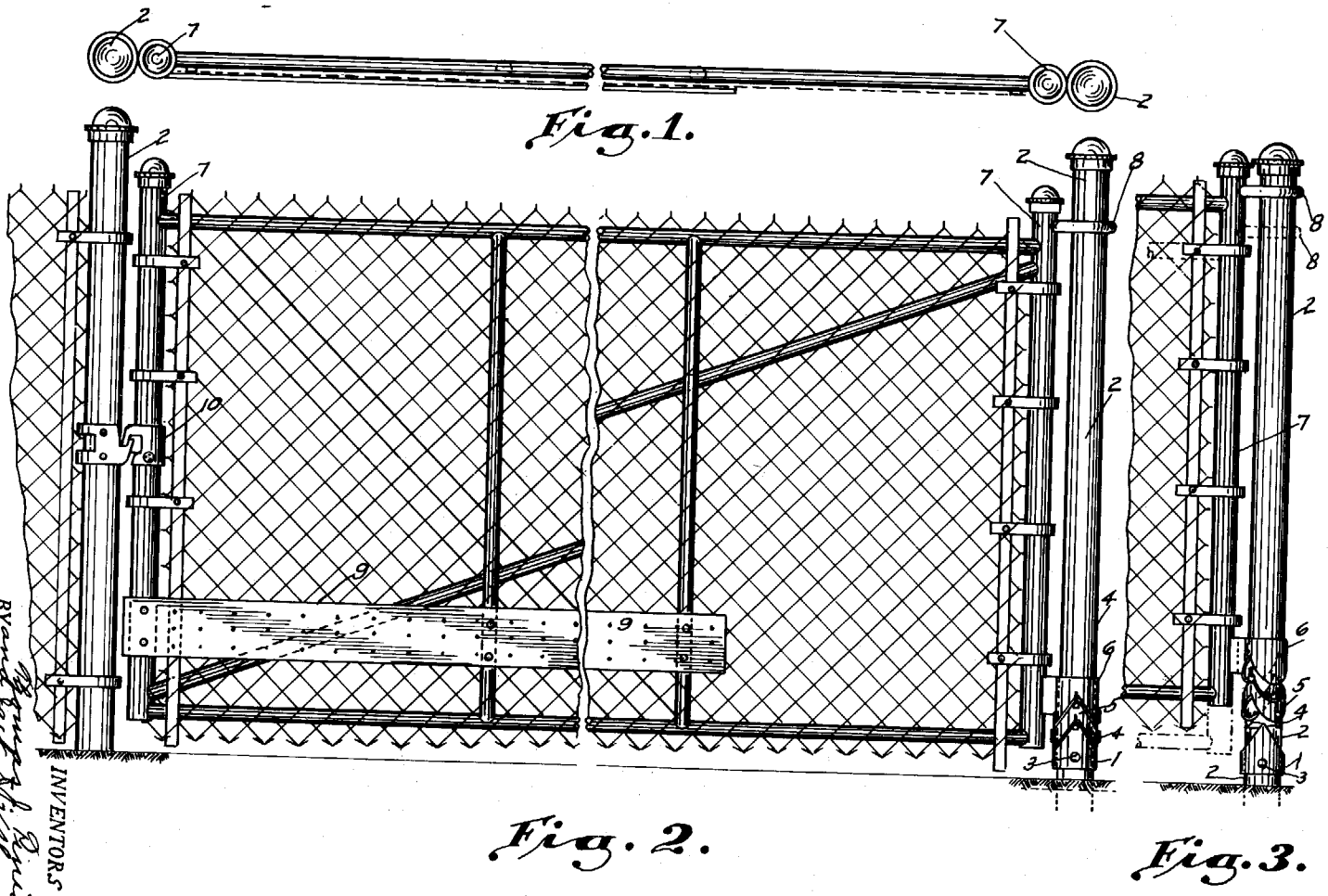
Figures 4, 5, 6, 7, 8, 9, 10:
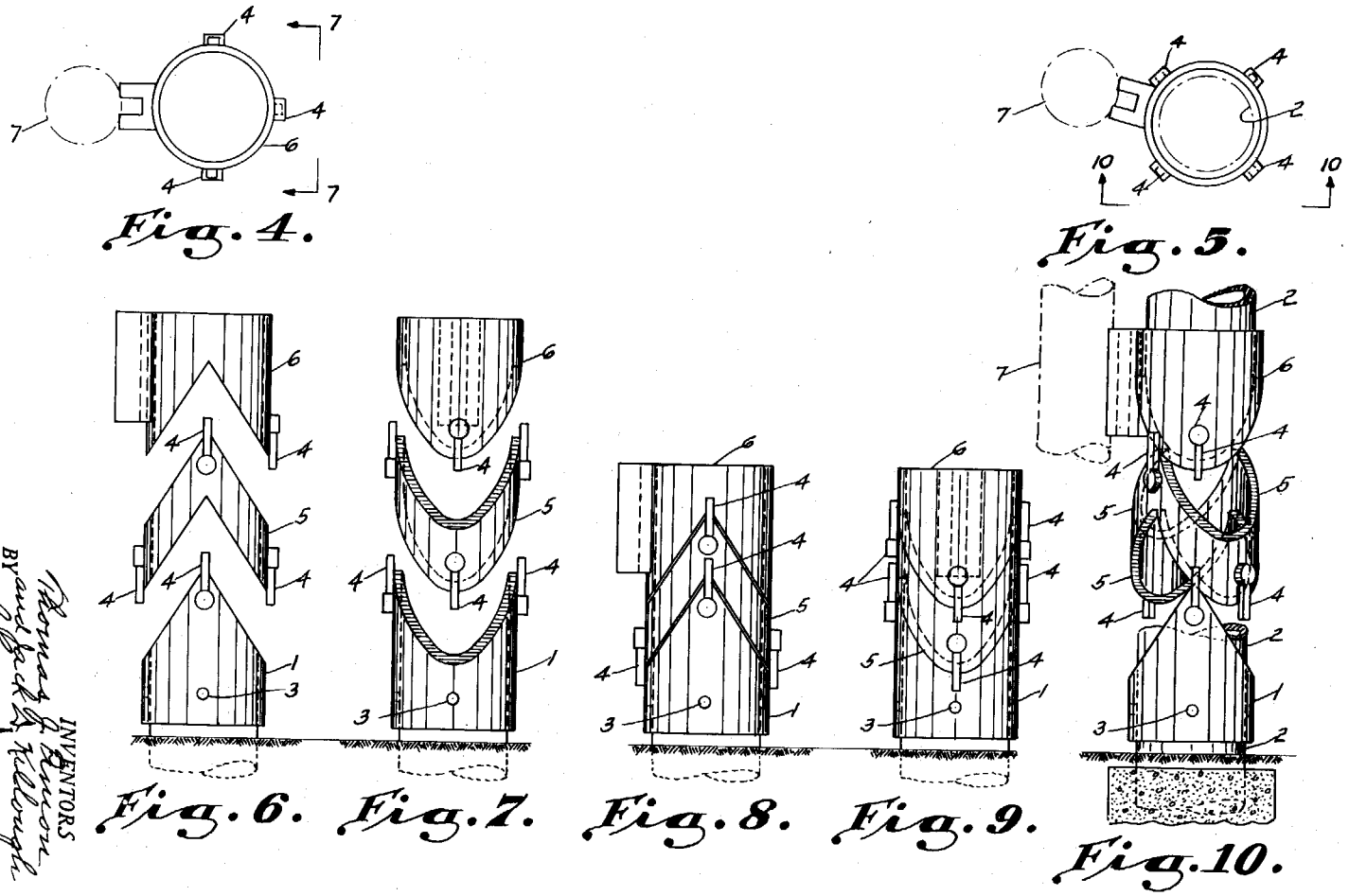

By referring generally to the drawings, a part of this application, it will be observed that Fig. 1 is a top plan view of a gate equipped with a hinge according to the present invention; Fig. 2 is an elevational view of the complete gate with hinge thereon; Fig. 3 is an elevational view of a part of the gate showing the hinge partly open; Fig. 4 is a top plan view of Fig. 6, with the gate frame member in broken lines, showing the position of the top portion of the hinge when the gate is closed; Fig. 5 is a view similar to Fig. 4 but showing the hinge partly open; Fig. 6 is a detail view showing the hinge parts separated and positioned with the gate closed; Fig. 7 is a view on line 7—7 of Fig. 4 showing the hinge parts separated [and positioned with the gate 90 degrees open]; Fig. 8 shows the hinge closed with the gate closed; Fig. 9 is an elevational view of the hinge closed with the gate closed; and Fig. 10 is a view on line 10—10 of Fig. 5 showing the hinge partly open on part of the supporting post and the foundation thereof.

Similar reference numerals refer to similar parts throughout the several views.

Referring to the drawings in detail it will be seen that the hinge comprises three parts, 1 that is attached to the supporting post 2 by a bolt 3, and is provided with integral abutting portions or lugs 4, and part 5 that is also provided with abutting portions or lugs 4, with part 5 adapted to partly revolve around the post 2, and part 6 that is also provided with integral portions or lugs 4, with part 6 attached to the gate frame member 7, and adapted to partly revolve around the post 2. The upper hinge member 8 is a ring around the gate post 2 and is adapted to slide upward and downward as the gate is opened and closed.

From the foregoing it will appear that when the gate is pushed open by an automobile moving against the board 9 on the gate, the top part of the hinge will revolve with the gate causing its integral lugs to make contact with the upper lugs on the freely revolvable member of the hinge to carry it around till its lower lugs make contact with the lugs on the bottom member of the hinge at which time the gate will be approximaely 135 degrees open. Then when the gate becomes free of obstruction it will automatically swing back to its closed position as a result of gravity forcing the hinge parts to their closed position.

The latch 10 of the gate will release the gate inward and outward as the downward extending portion of the gate part slides upon and off of the post part and is retained in a centered position by the slant structure of the hinge. The hinge will operate in the same manner when the gate is pushed open from either side and will swing to positions inward and outward to approximately the same degrees from the closed position. Latch 10 comprises collars secured on post 2 and member 7 and provided with interengaging portions which are disengaged when the gate is swung inwardly and elevated, and also outwardly as the hinge structure is identical for both movements as plainly shown in Figs. 6 to 10 inclusive.

The various parts of the hinge may be made of any material suitable for the purpose, but we prefer to use metal pipe or the like. Also the parts may be made in different sizes and capacities, depending on the size of the gates on which to be used.

While we have shown and described the preferred embodiment of our invention, we do not wish to limit same to the exact and precise details of structure, but reserve the right to make all modifications and changes so long as they remain within the scope of the invention and the following claims.

Having described our invention we claim:

*1.* A gate hinge of the character described comprising, a piece of metal pipe with one end cut straight across and designated the lower end, the upper end cut to form two opposite V-shapes, a lug attached to the outer face of the upper pointed portions of each V-shaped portion, a round metal pipe supporting post, said piece of pipe being adapted to be attached to the bottom portion of the supporting post, with the upper points of the V's at right angles to a plane perpendicular to the face of a gate supported on said post; a second piece of pipe cut to form V-shapes in both of its ends with the outer edges of the V's being parallel with each other and of a size to fit adjacent the V's in the said first member of the hinge, a lug attached to the outer end portion of the upper end of each V on said second hinge member and a lug attached to the lower outer end portions of each V on said second hinge member; a third piece of pipe with one end cut straight across and designated as the upper end, the lower end thereof being cut to form two opposite V-shapes of a size to fit in the V's of the second piece, a lug attached to each lower outer face portion of each V of said third piece of pipe, said upper third piece being attached to the frame of the gate with the lower points of its V's in line with the plane of the gate; said lugs on the upper third piece adapted to make contact with the upper lugs on the second piece and the lower lugs on the second piece adapted to make contact with the lugs on the first piece when the gate is moved inward or outward from its closed position.

*2. For use as a gate supporting and gravity closing hinge, a pair of sleeves disposed for mounting one above the other about a vertically disposed post, the upper sleeve being rotatable and slidable on the post and adapted for attachment to the gate and the lower sleeve being adapted for attachment to the post, an intermediate sleeve rotatable and slidable on the post between the said upper and lower sleeves, coacting interengaging cam surfaces on adjacent ends of said sleeves urging the gate toward closed position upon rotation of the upper and intermediate sleeves, and coacting means on said sleeves limiting relative rotation therebetween to the extent that said respective cam surfaces remain in said co-acting interengaging relationship, said coacting means including a stop member on each of said sleeves normally circumferentially spaced from and engaging a stop member on an adjoining sleeve during relative rotation of said sleeves whereby rotation of said upper sleeve with the gate will*

*turn said intermediate sleeve until its stop member engages the stop member on the lower sleeve.*

*3. For use as a supporting and gravity closing hinge for a gate, upper, lower and intermediate pipe-like hinge members, the adjacent ends of each of said members having thereon* V*-shaped cam surfaces which rotatably engage complementarily formed* V*-shaped cam surfaces on the other members, said upper member being adapted for attachment to the gate and the lower member being adapted for attachment to a gate post, and a stop on each of said members engageable with a stop on an adjacent member and effective to limit relative rotation of said members and thereby maintain said respective* V*-shaped cam surfaces in engagement, whereby upon opening the gate the upper and intermediate members rotate succes-*

*sively in that order relative to the lower member and when rotated urge the gate toward closed position.*

References Cited in the file of this patent or the original patent

UNITED STATES PATENTS

| | | |
|---|---|---|
| 231,907 | Goodwin | Sept. 7, 1880 |
| 785,550 | Hess et al. | Mar. 21, 1905 |
| 968,846 | Hahn | Aug. 30, 1910 |
| 1,180,336 | Sundh | Apr. 25, 1916 |
| 1,910,666 | Babson | May 23, 1933 |
| 2,628,441 | Enghauser | Feb. 17, 1953 |

FOREIGN PATENTS

| | | |
|---|---|---|
| 8,542 | Great Britain | July 26, 1890 |